April 30, 1940.  S. E. WINDER  2,198,750
GLASSWARE FORMING METHOD AND APPARATUS
Filed June 23, 1937   7 Sheets-Sheet 1

Inventor
Samuel E. Winder
By Cushman Darby & Cushman
Attorneys

April 30, 1940.    S. E. WINDER    2,198,750
GLASSWARE FORMING METHOD AND APPARATUS
Filed June 23, 1937    7 Sheets-Sheet 3

Inventor
Samuel E. Winder.
By
Attorneys

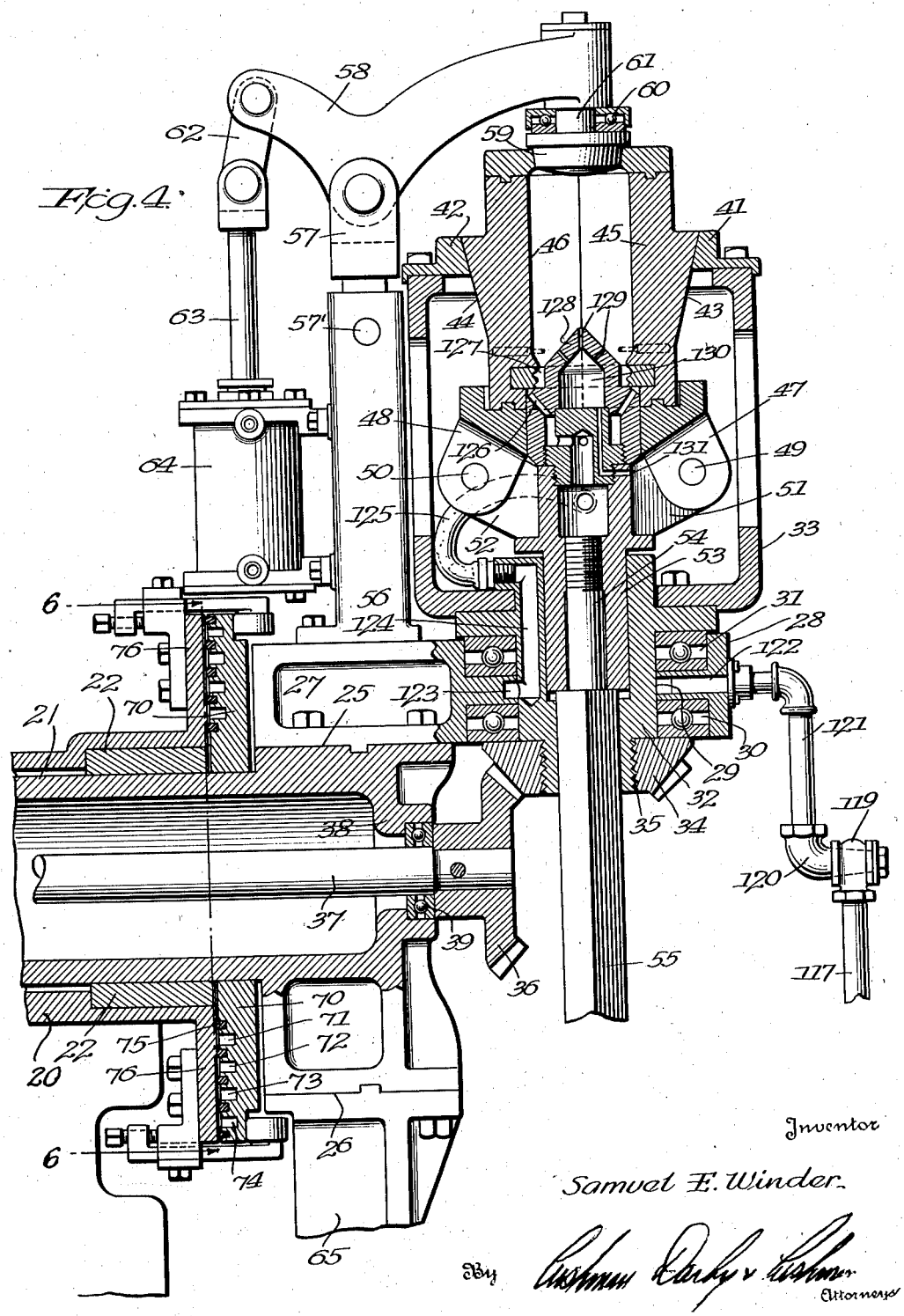

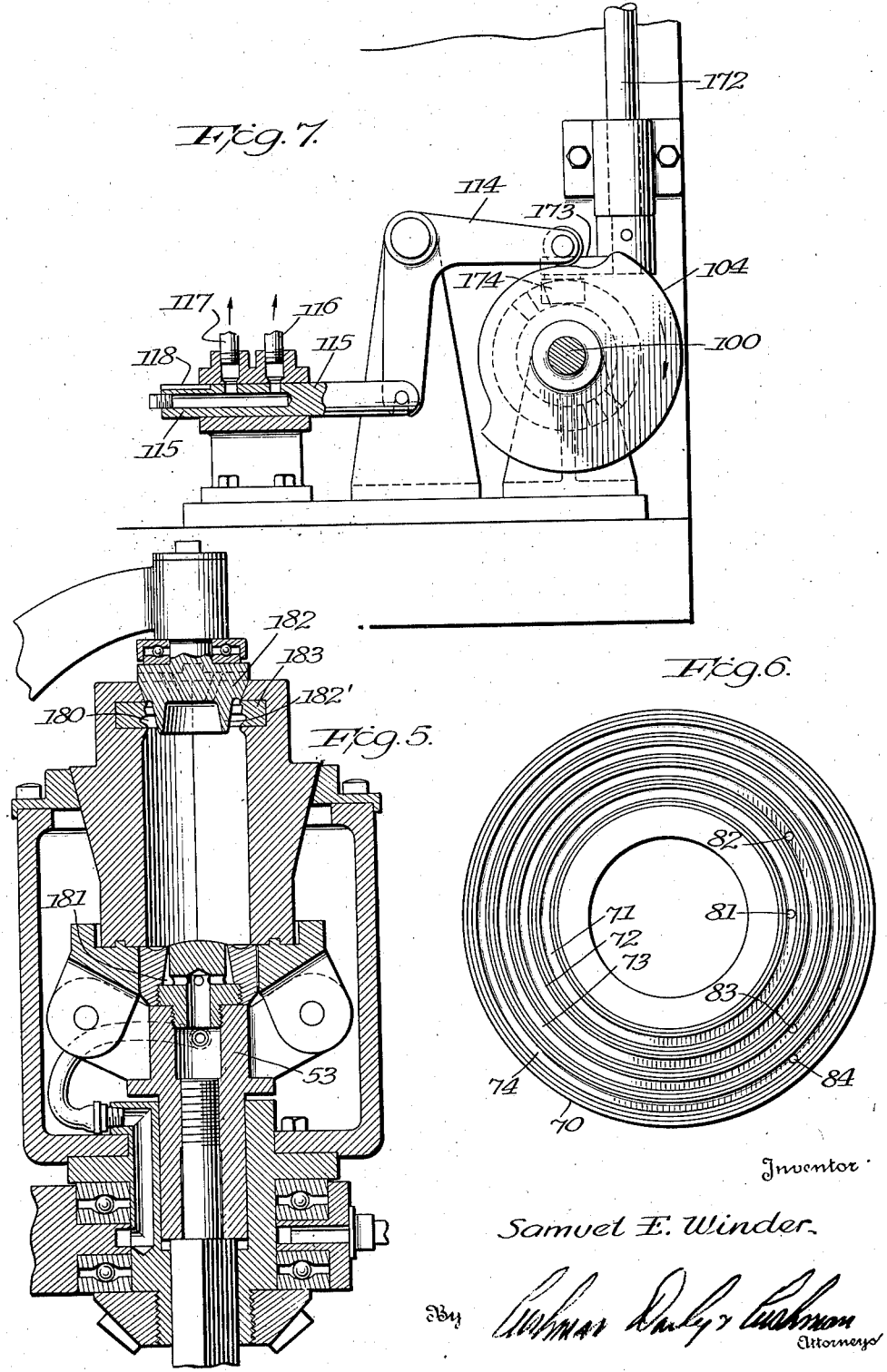

April 30, 1940.   S. E. WINDER   2,198,750
GLASSWARE FORMING METHOD AND APPARATUS
Filed June 23, 1937   7 Sheets-Sheet 6

Inventor
Samuel E. Winder.
By Cushman Darby & Cushman
Attorneys

April 30, 1940. S. E. WINDER 2,198,750
GLASSWARE FORMING METHOD AND APPARATUS
Filed June 23, 1937 7 Sheets-Sheet 7
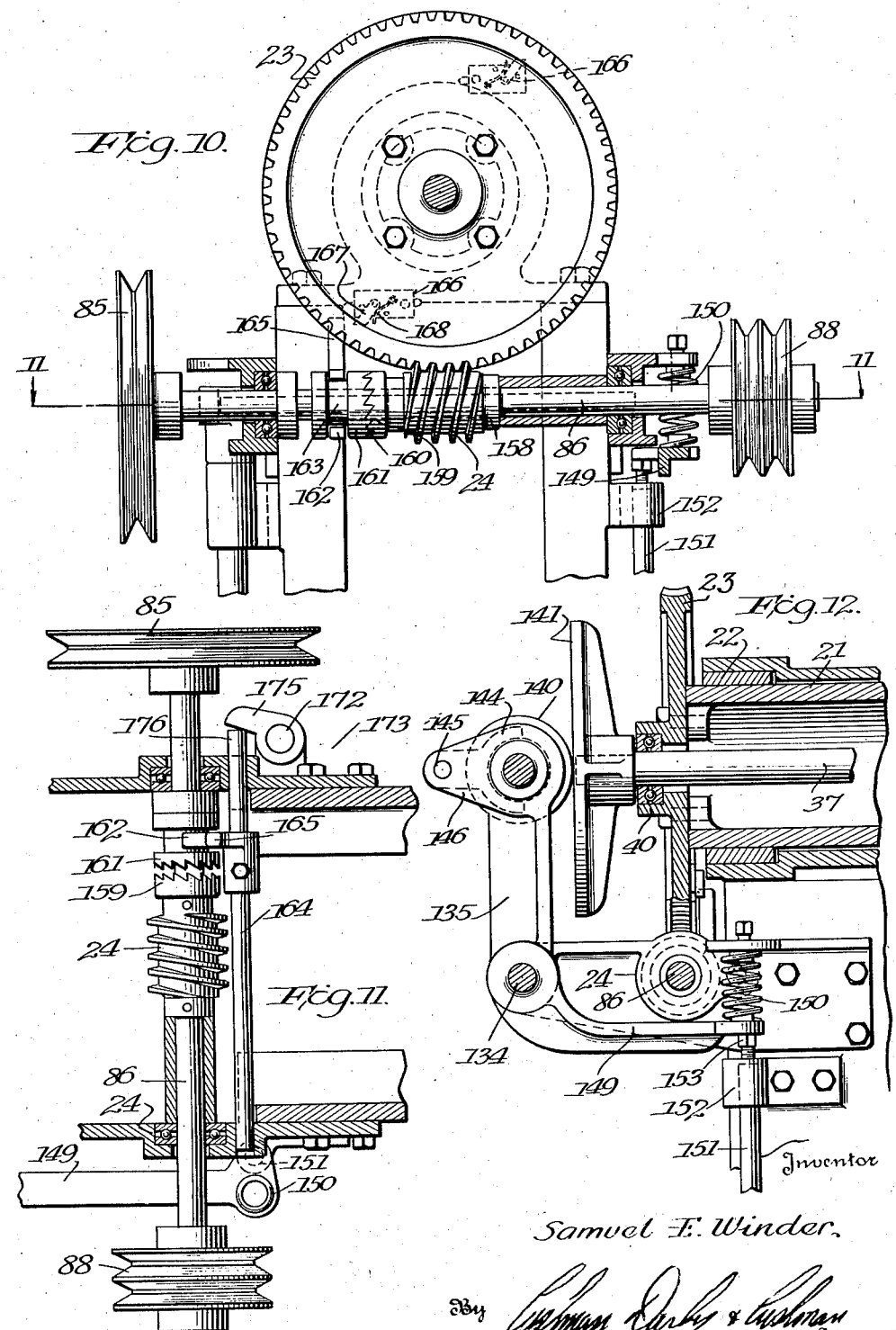

UNITED STATES PATENT OFFICE 2,198,750

GLASSWARE FORMING METHOD AND APPARATUS

Samuel E. Winder, Baltimore, Md., assignor to Crown Cork & Seal Company, Inc., Baltimore, Md., a corporation of New York Application June 23, 1937, Serial No. 149,991

29 Claims. (Cl. 49—29)

This invention relates to new and improved methods of manufacturing hollow articles of glassware, and to new and improved forms of apparatus for carrying out the methods.

It is a primary object of the invention to provide a method of and apparatus for completely forming an article of glassware in a single mould, thus dispensing with the use of parison or blank moulds such as are universally used in conventional bottle blowing machines. It is a further object of the invention to eliminate entirely the use of conventional blowing operations in shaping a charge of glass into the desired finished form. Another object is to produce articles of glassware characterized by an improved, uniform distribution of glass throughout the walls of the article; a more compact and dense wall structure; and a more uniform, compact, and dense neck finish.

According to the basic principle of the present invention, hollow articles of glassware are formed in a mould corresponding to the shape of the finished article, by the influence of centrifugal force on the glass in the mould. The present invention dispenses with the conventional operations of blowing or pressing a charge of glass into the form of a parison in a parison mould, transferring the blank or parison to a finish mould and blowing the blank to final form in the latter. Instead of expanding a charge of glass or a glass parison into desired shape by relatively high air pressure inside of the charge of parison, the charge, in accordance with the present invention, is expanded by the action of centrifugal force set up in the glass itself. Such action results in a markedly improved product, because it is well understood that an even distribution of glass in the walls of a glass article, such as a bottle or jar, is practically impossible in gob fed blowing machines of convention type, because of the unequal cooling of certain portions of the parison, and the consequent unequal expansion of the parison to finished form.

In accordance with the present invention, a charge of glass is deposited in a mould corresponding to the form of the finished article and the charge is distributed evenly and uniformly over the entire surface of the mould by centrifugal force set up in the molten glass itself. In addition to securing an improved distribution of glass in the walls of the article, the centrifugal force serves to increase the density of the glass and to eliminate flaws such as blisters and the like.

The method of the invention comprises broadly the formation of hollow articles of glassware primarily by the use of centrifugal force set up in a charge of glass in a mould cavity, the expansion of the glass charge to correspond to the form of the mould being permitted by the introduction of air, either at atmospheric pressure or slightly above atmospheric pressure, into the interior of the charge. Thus, in practicing the method a charge of glass is placed in a mould, the open end of the mould closed, and the glass subjected to centrifugal force by spinning the mould. In accordance with a preferred method, a vacuum is utilized to compact the glass in the neck finish. Air is introduced through the mouth forming pin of the mould to form a bubble interiorly of the charge. As the mould continues spinning, the centrifugal force in the glass causes it to expand, and the bubble enlarges as additional air flows thereinto through the mouth forming pin, until the glass covers the entire inner moulding surface of the mould and the bubble now forms the hollow interior of the article of glassware. As an alternative method, the invention contemplates initiating the formation of the article by the introduction of a puff of blowing air to form the bubble in the charge. This step may be used with or without a vacuum pull-down. As still another alternative, the vacuum may be applied to the portion of the mould which forms the bottom of the article, to hold the charge of glass on the bottom during the spinning. In this method, the glass will rapidly flow or roll along the surfaces of the mould toward the opposite end, where the neck finish ring is positioned. The glass will be packed into the neck finish of the mould under considerable pressure by the centrifugal force existing in the glass resulting from the spinning.

Preferably the method also includes a step of inverting the mould from its upright charge receiving position to a downwardly disposed discharge position, and preferably, though not necessarily, the mould is rapidly spun about its axis during the downward swing thereof.

Other objects and advantages of the invention will be apparent to one skilled in the art from a consideration of the following description of a preferred embodiment of the invention.

In the accompanying drawings:

Figure 4 is an enlarged vertical section through the mould and associated parts.

Figure 5 is a similar sectional view of a modified form of mould.

Figure 6 is a detail taken on line 6—6 of Figure 4.

Figure 7 is an elevation, partly in section, taken on line 7—7 of Figure 2.

Figure 10 is a vertical, transverse, sectional view of a portion of the rear end of the machine, taken from the left of Figure 1, substantially on line 10—10 of Figure 1.

Figure 11 is a horizontal section taken on line 11—11 of Figure 10, and

Figure 12 is a side elevation with certain parts broken away and other parts shown in section, showing a portion of the driving means and the control therefor, taken from the right side of Figure 10.

Figure 1:
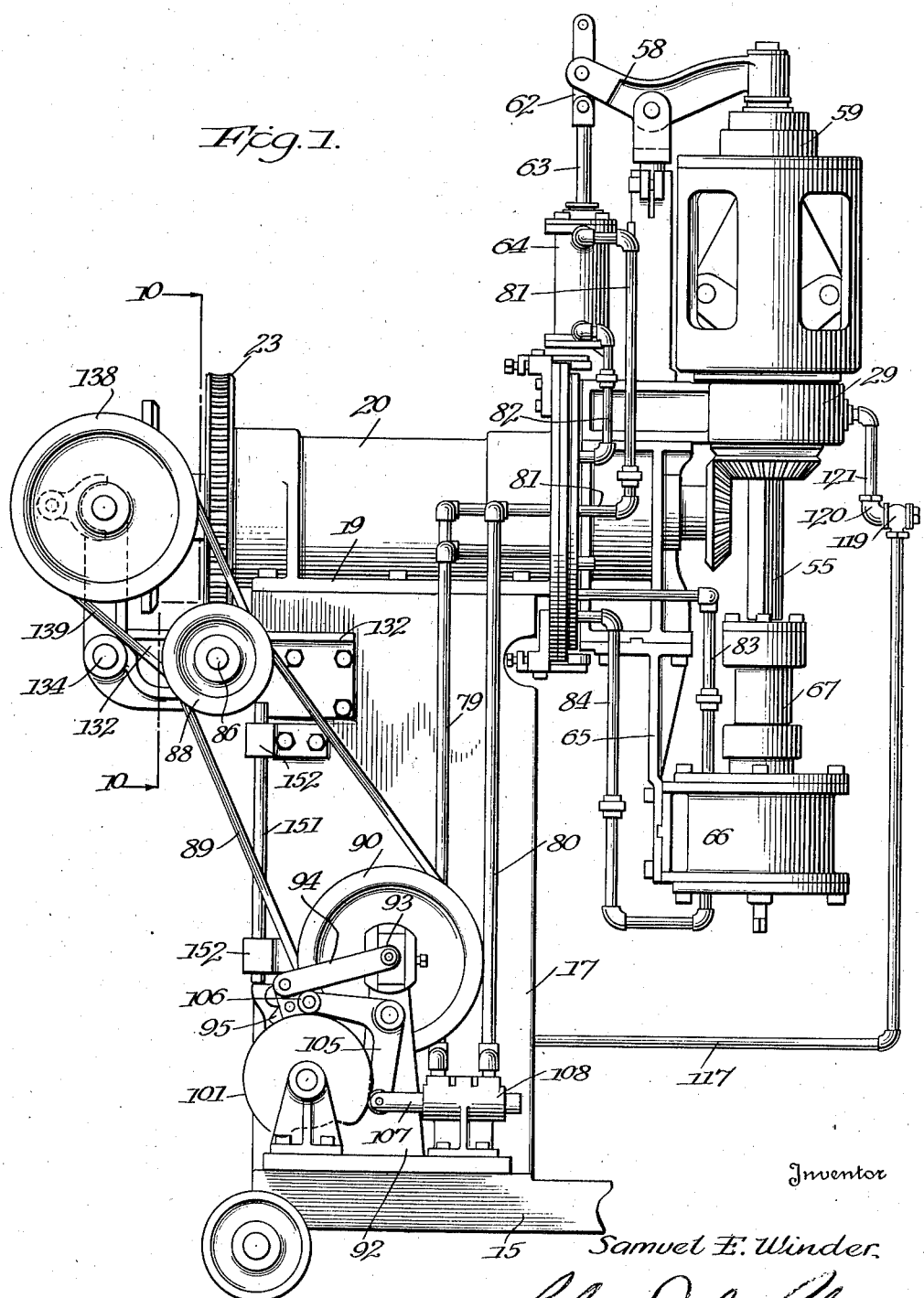
Figure 1 is a side elevation of a machine in accordance with the present invention.

The machine preferably comprises a base 15 mounted on wheels 16, so that it can be moved toward and away from a feeder of any desired type. A supporting frame comprising spaced plates or castings 17, 18 projects upwardly from the base 15. At its upper end, the frame supports a transverse casting 19, having formed integrally therewith, a cylindrical sleeve 20, enclosing an internal, rotatably mounted sleeve 21 (Fig. 4). This internal sleeve is appropriately journalled, by means of bushings or bearings 22, for rotation in the stationary, outer sleeve 20. At its rear end (Fig. 12) the sleeve 21 carries a large worm follower gear 23, in mesh with a worm 24, by means of which intermittent, partial rotation of the sleeve 21 may be effected, as hereinafter described.

At its forward end (Fig. 4) the sleeve 21 is extended and shaped to provide a rotatable head having diametrically opposed, flattened supporting surfaces 25, 26. Bolted to the surface 25 is a bracket 27 having an outwardly projecting portion 28 in which is formed a circular aperture 29. A pair of cooperating ball bearing and race assemblies 30, 31 are mounted above and below the central web of this projected portion and rotatably supported thereon is a spindle 32, carrying at its upper end a cage 33. At the lower end of the spindle there is a bevelled gear 34, appropriately secured thereon, as by threads 35. The bevel gear 34 is in mesh with a similar gear 36 fixed to the end of a shaft 37 journalled in the reduced end 38 of the rotatable sleeve 21, by appropriate ball thrust bearings 39. The opposite end of the shaft 37 (Fig. 12) is journalled in a collar or hub 40 associated with the large worm follower 23. When rotation is imparted to the shaft 37 by means hereinafter described, the gears 36 and 34 will impart rotation to the spindle 32 and to the cage 33 supported thereon.

The upper end of the cage 33 is provided with inwardly projecting cam or wedge members 41, 42 adapted to bear against corresponding surfaces 43, 44 formed on the exterior of the mould halves 45, 46. The mould halves are secured at their lower ends to link elements 47, 48, pivoted at 49, 50 between outwardly projecting pairs of ears 51, 52, formed integrally with or attached to a core 53 disposed centrally within the spindle 32. This core member is threaded to the upper end 54 of a squared shaft 55 which extends axially of the spindle for relative longitudinal movement therein, to effect opening and closing of the mould, as hereinafter described.

Bolted to the upper side of the bracket 27 is an upstanding post 56 carrying at its upper end a fulcrum piece 57 upon which a lever 58 is mounted for pivoting movement. Any appropriate means such as a set screw 71' may be provided for adjusting the vertical position of the fulcrum piece 57, to accommodate moulds of different vertical dimensions.

One end of the lever 58 carries a mould closure member 59, adapted to be swung down to close the open end of the associated mould. This closure member is journalled, by means of ball bearings 60 or the like, for rotation about the axis of the short spindle 61. The other end of the lever 58 is connected by means of an adjustable link 62 to the piston rod 63 of an air motor 64. When air is admitted to and exhausted from opposite ends of the motor 64, the lever 58 is oscillated to open and close the upper end of the mould, as hereinafter described.

The lower supporting surface 26 of the rotatable sleeve 21 carries a depending bracket or frame 65 bolted or otherwise secured thereto. The bracket 65 carries the cylinder 66 of an air motor, having its piston rod 67 connected to the squared shaft 55 by a ball bearing coupling 68, whereby the shaft 55 may rotate about its axis, without imparting rotation to the piston rod 67 or the piston mounted within the cylinder 66.

Referring to Figures 4 and 6, the rotatable sleeve 21 has secured thereto a radially projecting air distributing plate 70 provided with a plurality of circumferential grooves or channels 71, 72, 73, 74 in its rear face. Packing rings 75 are disposed adjacent these channels or grooves to prevent the escape of air. The stationary sleeve 20 is provided with a circular flange 76, cooperating with the distributing plate to close the channels. The flange 76 is drilled at appropriate points (Fig. 2) to give access to each of the channels 71–74, and pipes 77, 78, 79, 80 are connected at those points respectively. The distributing plate 70 is likewise appropriately drilled (Fig. 6) and pipes 81, 82, 83, 84 are connected to register with the channels 71–74, respectively. By means of these pipes and channels, operating air can be admitted at predetermined times to opposite ends of the cylinders 64, 66 respectively, by valve means hereinafter described.

Figure 2:
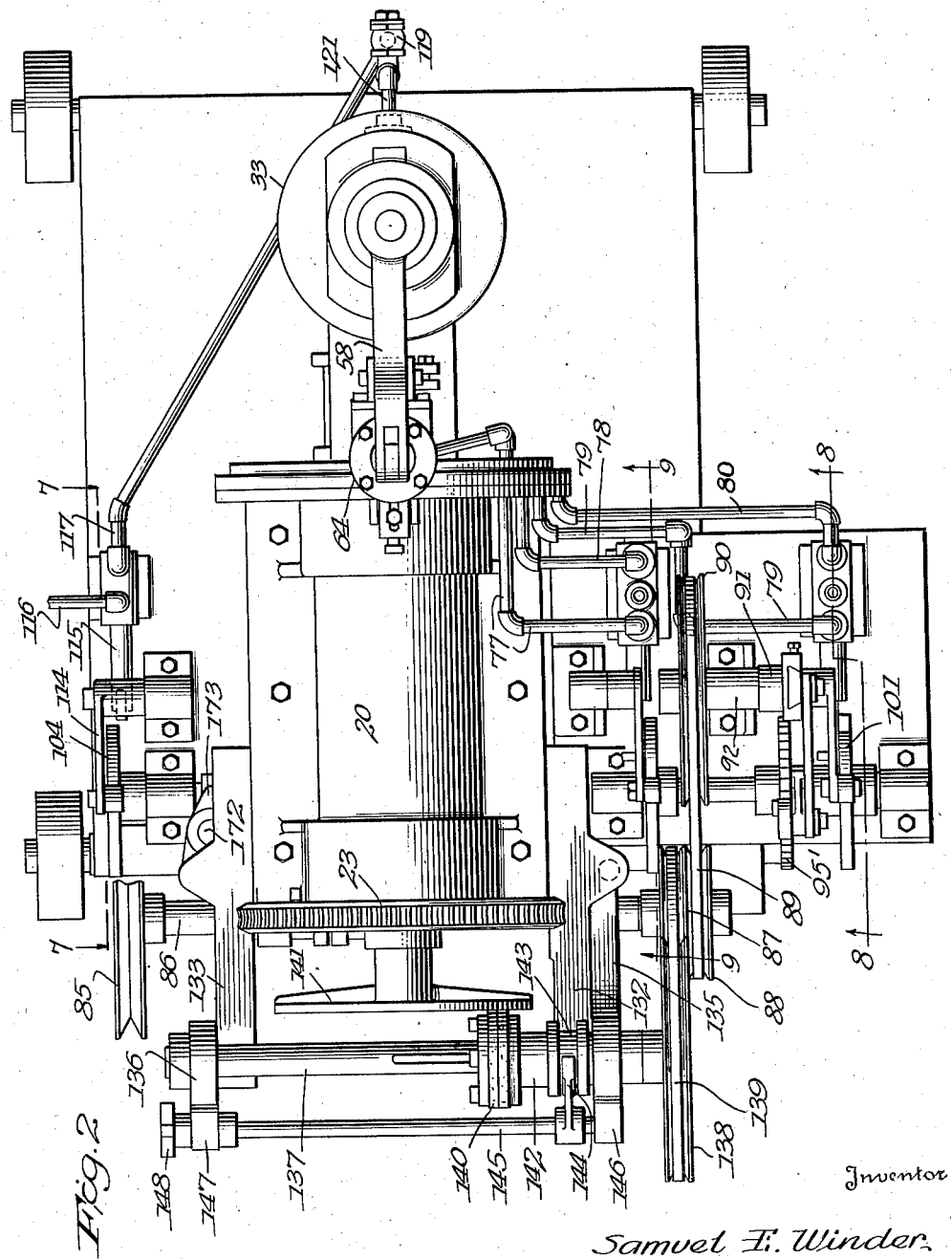
Figure 2 is a top plan view.
Figure 3:
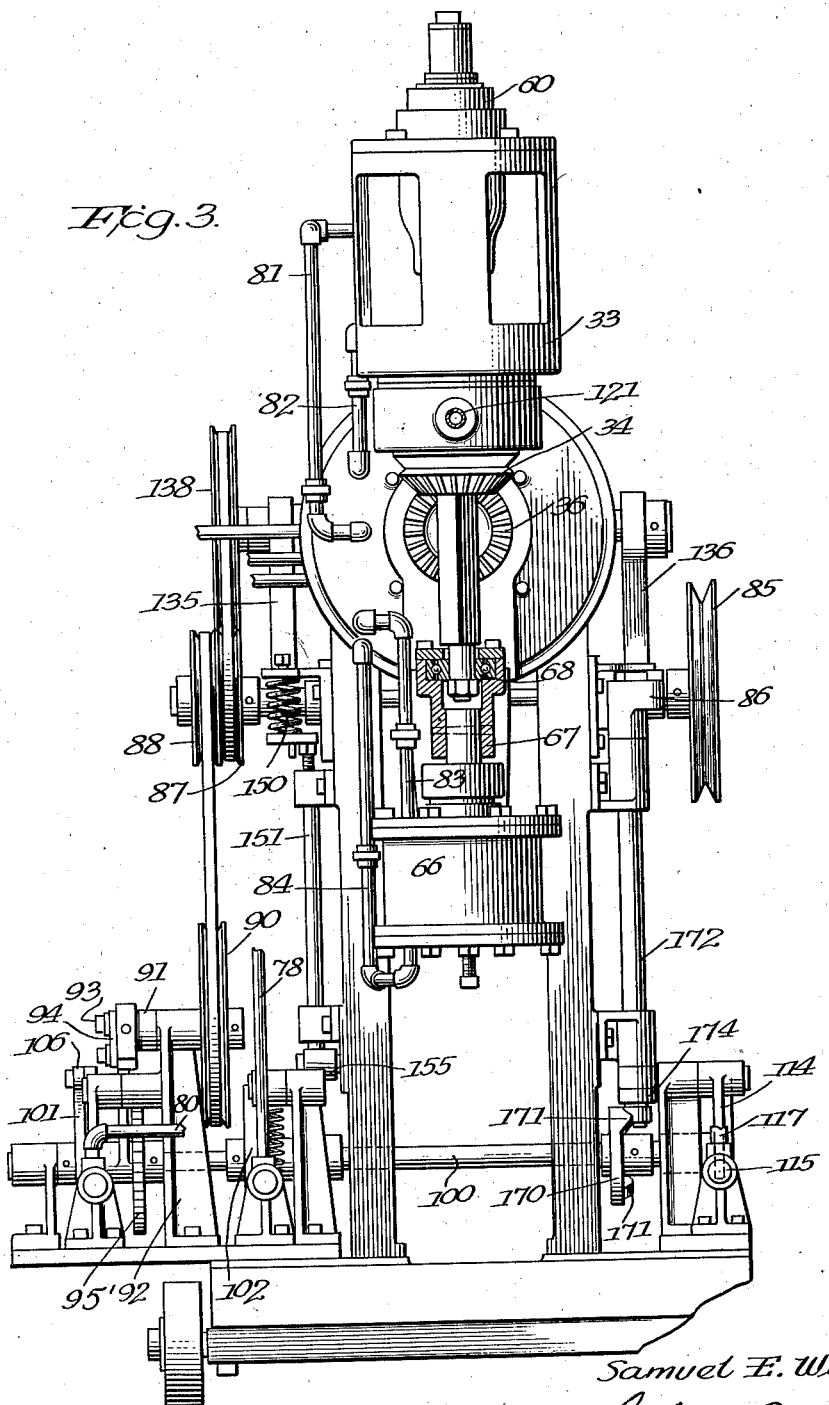
Figure 3 is a front elevation.

The power transmission means and the timing means for the machine will now be described. The pulley or sprocket wheel 85 (Fig. 2) is driven from any suitable source of power, such as an electrically driven speed variator, at an adjustable, but normally constant, rate of speed. The pulley 85 is fixed upon a transverse shaft 86 having a pair of pulleys or sprockets 87, 88 fixed to its other end. A belt or chain 89 extends downwardly from the pulley 88 and is trained about a pulley 90 mounted on a transverse stub shaft 91 supported in a bracket 92 extending upwardly from the bed of the machine (Figs. 1, 2 and 3). The shaft 91 carries at its opposite end an adjustable eccentric pin 93, (Fig. 8) to which is attached a pitman 94 which is supported at its other end by a lever 94' pivoted about the shaft 100, hereinafter mentioned. The pitman carries at its free end, a pawl 95, pressed downwardly by a spring 96. The eccentric pin 93 is mounted on a block 97 (Fig. 8) which is adjustable in a groove 98 in the hub on the end of shaft 91, to permit adjustments as to the throw of the eccentric.

The pawl 95 engages and drives the teeth on the periphery of a ratchet wheel 95', secured to a transverse shaft 100, which acts as a main timing cam shaft for the machine. Upon this shaft 100 are adjustably secured four cams 101, 102, 103 and 104. The first cam 101 controls the flow of operating air to the large air motor 66; the second cam 102 controls the operating air to the cylinder 64; the third cam 103 controls the transmission of power to spin the mould; and the fourth cam 104 controls the vacuum which may be applied to the bottom of the mould when the charge is deposited therein, all as hereinafter described.

Figure 8:
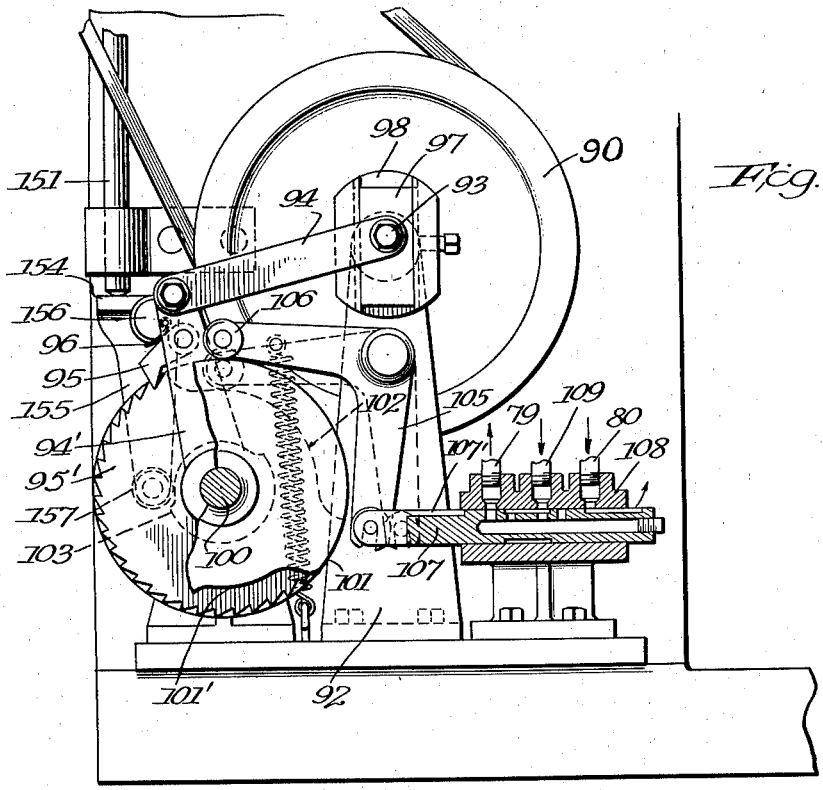
Figure 8 is an elevation with certain parts broken away and other parts in section, showing the main cam shaft, its operating mechanism and certain of the air control valves, this view being taken substantially on line 8—8 of Figure 2.

During the operation of the machine the shaft 86 and the pulleys 87, 88 are rotated continuously. Consequently, the pulley 90 and the pawl and ratchet mechanism serve to impart constant intermittent motion to the shaft 100 and the cams carried thereby. Pivotally mounted on the upstanding bracket 92 is a bell crank lever 105 having a roller 106 in engagement with the periphery of the cam 101. The other end of the bell crank is connected to the barrel 107 of a slide valve 108. Referring to Figure 8, the conduit 109 leads from a suitable source of air under pressure to the casing 108. When the valve is in the position shown, air under pressure flows through the pipe 79 to groove 73 in the distributing plate 70 and thence to the pipe 83 leading to the upper end of the cylinder 66, thereby forcing the piston in the cylinder 66 downwardly and drawing the spindle 32 and the mould parts carried thereby downwardly in the cage, so that the wedge surfaces 43, 44 on the mould engage the surfaces 41, 42 associated with the cage to maintain the mould parts closed. When the bell crank lever 105 is in the opposite position, i. e., when the roller 106 drops into the valley 101', air will obviously flow from the pressure line 109 to and through the pipe 80, groove 74 and the pipe 84 to the lower end of the cylinder 66 to move the mould outwardly with respect to the cage to cause an opening of the mould, the air return from the upper end of the cylinder 66 being permitted through the pipe 79 and channel 107' of the valve barrel 107.

Figure 9:
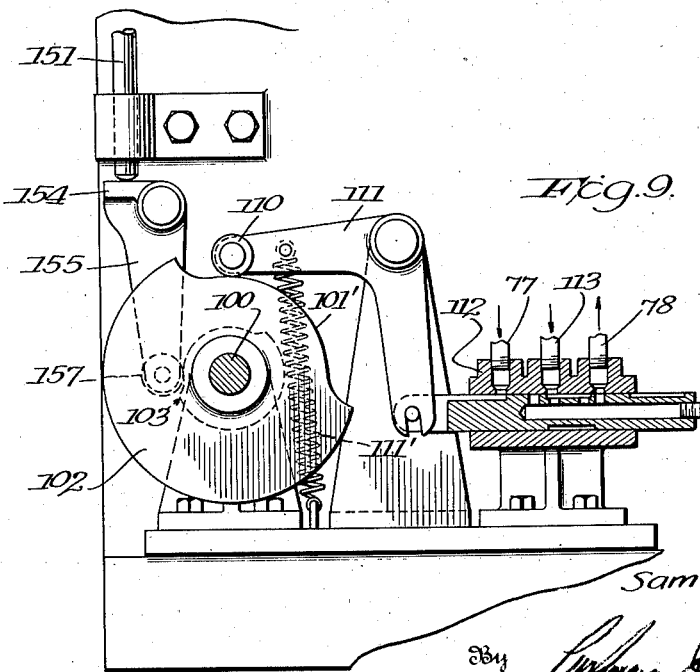
Figure 9 is a similar view taken on line 9—9 of Figure 2.

In Figure 9, the valve mechanism for controlling the operation of the small air motor 64 is shown. The cam 102, adjustably fixed on the shaft 100, is provided with a valley 101' in which the roller 110 of bell crank 111 may be drawn by spring 111'. The bell crank 111 is connected to a valve assembly 112, which may be substantially identical to that shown in Figure 8 and described above. Air from the source of supply enters the valve through pipe 113 and is distributed, alternately, to pipes 77 and 78 which lead respectively through channels 71 and 72 to pipes 81, 82. When the roller 110 is in the valley of the cam, air under pressure will flow from the pipe 113 through the pipe 78, distributing groove 72 and the pipe 82 to the lower end of the cylinder 64, to rock the lever 58 and apply the mould closure piece 59 to the mould to close the mould. On the contrary, when the bell crank 111 is shifted to the other position, air will flow from the pipe 113 to the pipe 77, and through the distributing groove 71 to the pipe 81 and thence to the upper end of the cylinder to effect opening of the mould by removal of the member 59.

At the extreme opposite end of the cam shaft 100 is another cam 104 (Fig. 7) constructed in substantially the same manner as the cams 101 and 102. This cam is connected by a bell crank 114 to a slide valve 115, which controls the application of vacuum to the lower end of the mould. Pipe 116 is connected to a suitable source of vacuum, such as a vacuum pump and tank. Pipe 117 leads to the mould as hereinafter described. The barrel of the valve 115 is provided with apertures which bring the pipes 116 and 117 into communication in one position, and with a slot or the like 118 which, in the other position of the valve, places the pipe 117 in communication with atmosphere. The cam 104 is adjustably secured on the shaft 100 so as to apply the vacuum to the mould at predetermined times in the cycle of operation of the machine.

Referring to Figures 1 and 2, it will be seen that the vacuum pipe 117 leads forwardly and then upwardly to a point in alignment with the axis of the sleeve 21, at which point there is positioned a rotatable joint 119. Swivelled axially in the joint 119 is an elbow 120 connected by pipes 121 to the projecting portion 28 of the bracket 27. The bracket is provided (Fig. 4) with a passage 122 communicating with an annular recess 123. The spindle 32 is provided with a bore 124 communicating with the recess 123 at its lower end and provided with any suitable connection at its upper end, such as a flexible rubber hose 125 to the interior of the vertically movable core 53. By means of passages 126, the interior of the core is in communication with the bottom of the neck finish portion 127 of the mould, the latter being defined by a neck ring and a mouth forming pin 128. The pin 128 is provided with apertures 129 communicating with its hollow interior 130 and the latter is open to atmosphere by means of the vent passage 131.

Thus, by the means just described, the neck finish portion of the mould may be subjected to the influence of a vacuum, to compact the glass therein. The area adjacent the tip portion of the mouth forming pin, however, is in communication with the atmosphere, to facilitate the formation of a bubble in a charge of molten glass and the expansion of the blank into hollow form under the influence of centrifugal force, as hereinafter described.

The main frame of the machine is provided with a pair of rearwardly projecting arms 132, 133 (Figs. 1 and 2) in the outer end of which a shaft 134 is mounted. A bell crank lever 135 is fixed on the shaft adjacent the supporting arm 132. At the other side of the machine a straight lever 136 is fixed to and extends upwardly from the shaft 134 in parallel relation to the upright arm of bell crank 135. A transverse shaft 137 is journalled for rotation in the upper end of the bell crank 135 and in the upper end of the straight lever 136. This shaft 137 carries a pulley or sprocket 138 having a belt or chain 139 trained about its periphery and about the pulley 87 (Figs. 1 and 2). The shaft 137 also carries a friction driving wheel 140 splined thereon for longitudinal movement over the face of a friction driven disc 141 secured to the rear end of the shaft 37 (Figs. 2 and 12). The friction driving wheel 140 is provided with an elongated hub 142 having a clutch groove 143 therein which receives a shifting fork 144. The rear end of the fork is threaded on a transverse rod 145 mounted in offset portions 146, 147 of the bell crank lever 135 and the straight lever 136 respectively. By manipulation of the hand wheel 148, the fork 144 and the friction wheel 140 may be shifted relatively across the face of the driving disc 141 to adjust and change the speed ratio between the driving member 140 and the driven member 141.

Referring to Figure 12, it will be noted that the lower, horizontal arm 149 of the bell crank 135 is urged downwardly by a compression spring 150, whereby the friction wheel 140 is normally urged into engagement with the disc 141. Beneath this arm 149 there is positioned a vertical rod 151 guided in brackets 152 and provided at its upper end with an adjustable head in the form of a bolt 153. As shown in Figure 8, the lower end of the rod 151 is positioned immediately above an offset portion 154 of a lever 155 pivoted at 156 and provided with a roller 157 engaging the cam 103, heretofore mentioned. When the lever 155 is rocked toward the left in Figure 8, the rod 151 will be raised slightly, thereby rocking the bell crank 135 rearwardly and moving the driving wheel 140 out of engagement with the driven disc 141, thereby terminating the transmission of power to the shaft 37 and, through the gears 36, 34, to the mould supporting spindle 32.

The main drive shaft 86, which is constantly rotating when the machine is in operation, carries a worm 24 (Figs. 10 and 11) loosely mounted for relative rotation with respect thereto, but restrained against endwise movement by any suitable means, such as a sleeve or collar 158. One end of the worm is connected to a clutch hub 159 having a plurality of teeth 160 on its end face. A complemental clutch member 161 is splined upon the shaft 86 for longitudinal movement with respect to the clutch hub 159. This movement is controlled by a fork 162 disposed in a groove 163 of the member 161 and pinned or otherwise secured to a transverse clutch control rod 164 (Fig. 11). The fork member is additionally provided with an upwardly projecting abutment finger 165, by means of which the rod 164 and the fork may be shifted in one direction to disengage the clutch teeth 160. This shifting movement is effected by duplicate latch mechanisms carried on the front face of the large worm followers 23. As shown in Figure 10, in dotted lines, each latch mechanism comprises a block 166, a pivoted detent 167 and a light leaf spring 168. When the worm follower 23 is being rotated in a clockwise direction (Fig. 10), the detent 167 will ultimately engage the upstanding finger 165 and shift the fork 162 and the clutch member 161 toward the left to disengage the clutch members and terminate the transmission of driving force from the constantly rotating shaft 86, upon which the clutch element 161 is splined, to the worm 24, the worm follower 23 and the rotatable sleeve 21. It will be remembered, of course, that the sleeve 21 carries the mould supporting frame, the air motors and associated parts. As indicated in Figure 10, the worm follower 23 is preferably provided with two latch mechanisms 166, to interrupt the rotation of the sleeve 21 at two points in each complete rotation of 360°. As hereinafter explained, one interruption is to permit charging of the mould, and the other to permit the discharge of the completed article of glassware.

Automatic means for shifting the clutch controlling rod 164 to driving position are provided. Preferably this means comprises another cam member 170 (Fig. 3) fixed on the main cam shaft 100 having two humps or projections 171 on its outer face. A vertical shaft 172 (Figs. 2, 3, 7 and 11) is provided with an offset arm 173 carrying a roller 174 adapted to be engaged by the projections 171, associated with the cam member 170, to oscillate the shaft 172. At its upper end shaft 172 (Fig. 11) carries a projecting finger 175 in engagement with the adjacent end 176 of the transversely disposed clutch controlling shaft 164. Thus, when the projections 171 on the cam 170 engage the roller 174 to oscillate the shaft 172, the finger 175 associated with that shaft will shift the clutch member 161 into driving engagement with the clutch member 159, whereby the worm 24 and the parts associated therewith are rotated until the driving engagement is again interrupted by one of the latch mechanisms 166.

In the modified form of mould construction shown in Figure 5, the neck finish 180 is disposed at the upper end of the mould. The vacuum is applied to the bottom end of the mould through passages 181 leading to the hollow interior of the core 53 in substantially the same manner as previously described. In this form of the invention, the mould closure member 182 cooperates with the neck ring 183 to form the finish. In some cases, it is found desirable to form the bottle or jar in a mould of this type, but the vacuum pull-down into the neck finish, as shown in Figure 4, is preferred.

It will be noted from the above that the machine includes many adjustable features, which permit great flexibility of action. The speed of the main driving pulley 85 may be adjusted through wide limits by adjusting the associated speed variator which is connected in driving relation to the pulley 85. The speed of rotation of the spindle 32 relative to the rotation of the main sleeve 21 may be varied by shifting the friction driving wheel 140 radially along the face of the disc 141, by manipulation of the hand wheel 148. Thus, by adjusting the speed variator controlling the rotation of the shaft 86 and by adjusting the position of the driving wheel 140, the time cycle of the intermittent partial rotations of the sleeve 21 may be changed while maintaining the spinning speed of the mould constant, or, the speed of the mould rotation may be changed while maintaining the time cycle of the sleeve constant.

The speed of movement of the cam shaft 100 and of the cams carried thereby may be changed without changing the aforementioned adjustments. By shifting the eccentric pin 93 radially with respect to the center of the shaft 91, the stroke of the pawl 95 may be varied, to change the number of teeth skipped during each stroke, and consequently the speed of the ratchet wheel 90. The cams are all preferably adjustably mounted on the shaft 100, so that the timing of the various operations controlled by these cams may be changed at will by shifting the cams circumferentially with respect to the shaft. Moreover, the invention contemplates using cams of a known type having adjustable lobes thereon, adapted to change the shapes of the cam surfaces, to permit timing adjustments. If desired, the cams may be removed at will, and differently shaped cams substituted. If this system is employed, diametrically split cam discs may be used to facilitate installation and removal thereof.

It will thus be seen that all of the operations of the machine are adjustable in time with respect to the others.

In the operation of the machine of the present invention and in performing the novel method thereof, the machine, at the start of a cycle, will be in substantially the position shown in Figure 1, with the exception that the air motor 64 will be in the position to maintain the mould closure member 59 in the open position. The main drive shaft 86, of course, will be rotating, and the clutch 159—161 will be disengaged. Likewise, the friction driving wheel 140 will be tipped rearwardly out of engagement with the disc 141. Consequently, the sleeve 21, the shaft 37 and the mould rotating spindle 32 will be at rest. A charge of glass is now placed in the open mould by any appropriate means, the charge preferably being more fluid and at a higher temperature than is conventionally used in gob fed bottle blowing machines.

The cams are so arranged that, as soon as the charge has been placed in the mould, the roller 110 will drop down into the valley 101' of the cam 102, thereby shifting the valve 112, so that operating air is conducted through the pipes 78 and 82 to the lower end of the cylinder 64 to lower the mould closure member 59 and close the mould. As soon as this has occurred, or simultaneously therewith, the roller 157 will drop into the valley of the cam 103 (Figs. 8 and 9) and the bell crank lever 135 will be shifted by the spring 150 to force the driving wheel 140 into engagement with the disc 141, whereupon the shaft 37 will impart a similar rapid rotation to the spindle 32, the mould cage 33 and the mould supported therein, thereby subjecting the charge of glass to a sufficiently high degree of centrifugal force.

Simultaneously with the initiation of this rotation, or, in fact, preferably shortly prior thereto, the vacuum valve 115 (Fig. 7) will have been shifted by the cam 104 to apply vacuum to the neck finish of the mould, so that the glass, as soon as it is placed in the mould, will be compacted in the neck finish.

In predetermined timed relation to the initiation of rotation of the mould about its axis, one of the humps or projections 171 will serve to oscillate the shaft 172 and shift the clutch member 161 into engagement with the clutch 159, whereupon driving force is transmitted to the worm 24 and thence to the worm follower 23, to rotate the sleeve 21 and to revolve the mould relatively slowly about the axis of the sleeve 21.

The mould will continue spinning about its own axis as it is revolved or swung about the axis of the sleeve. Due to the centrifugal force set up in the glass by the rotation of the mould, the glass will flow outwardly and upwardly along the sides of the mould, the expansion of the glass being permitted by the in-flow of atmospheric air into the interior of the charge of glass through the vent opening 131 and passages 129 (Fig. 4). In a very short space of time, the glass will completely cover the inner surface of the mould and of the closure plate 59 and the article of glassware will be completely formed.

The mould may continue spinning until it reaches the diametrically opposite position from that shown in Figures 1 and 4, i. e., until it is positioned directly downwardly, with the air motor 66 positioned upwardly. Thereupon, the cam 102 will shift the valve 112 to conduct pressure air from pipe 113 through pipe 77, distributing groove 71 and pipe 81 to the upper end of the cylinder 64, to open the mould by removing the closure plate 59. Simultaneously, or immediately thereafter, the cam 101 will cause roller 106 to drop into the valley 101', to shift the valve 107 so that operating air will flow from the pipe 109 through pipe 80, distributing groove 74 and pipe 84 to the outer end of the air motor 66, which serves to move the mould longitudinally with respect to the cage to open the mould and permit the discharge of the bottle. As soon as the bottle has been discharged, the mould halves preferably close, leaving the closure piece 59 open, and the clutch 159, 161 is again brought into engagement to impart rotation to the worm follower 23, whereupon the sleeve 21 and the parts carried thereby are returned to the initial charging position. The cam 103 is preferably so shaped that the mould is not spun about its axis during the return oscillation from the discharge position to the charging position.

It is thought that the method of the present invention will be apparent to one skilled in the art from a consideration of the above description of the operation of the machine. When using a mould of the type shown in Figure 4, a charge of glass is placed in the mould and the neck finish portion is filled by the application of vacuum. As the mould is spun, centrifugal force will impart an expansive tendency to the glass and air will flow through the openings 129 in the neck pin to form a bubble interiorly of the charge to permit this expansion. As the centrifugal force continues, the charge will expand to the form of a mould, and the bubble will assume the shape of the interior of the article of glassware, additional air flowing into the interior to permit this action. If desired, the passage 131 may be connected to a suitable source of air under pressure to initiate the formation of the bubble and to assist in the expansion of the glass.

In the method according to Figure 5, a charge of glass is placed in the mould and vacuum is applied to the bottom forming surface thereof through the passages 181. This serves to hold the glass on the bottom, so that an unduly thinned walled lower end of the article is not formed. Under the influence of centrifugal force, the glass will flow upwardly along the mould walls and into the neck finished portion 180. The downwardly projecting flange 182' of the mould closure member 182 will act as a dam to prevent the flow of glass across the mouth of the article. The glass is tightly compacted in the neck finish portion by the action of centrifugal force and this packing is assisted by gravity when the mould is inverted.

The spinning of the mould preferably continues just long enough to assure that the glass has solidified and that the article will be self-sustaining, whereupon the spinning action stops and the mould is opened to permit discharge of a completed article of glassware.

It must be understood that the foregoing description and the apparatus shown in the drawings is illustrative only and that the invention is in no sense limited to the details described and shown. Many modifications of the invention will occur to one skilled in the art and all such changes as come within the scope of the appended claims or their equivalents are within the invention.

I claim:

1. The method of forming hollow glass articles comprising providing a completely enclosed mould cavity of substantially the form of the finished article, opening the mould and depositing a charge of glass therein, closing the mould, forming an air bubble in the interior of the charge, rotating the surfaces of the mould cavity and subjecting the glass to centrifugal force, expanding the glass and said bubble by said centrifugal force to cause the glass to assume the form of the mould cavity, and, during the subjection of the glass to said centrifugal expanding force, admitting additional air at atmospheric pressure into said bubble to permit the same to increase in volume with the expansion of said charge.

2. The method of forming articles of glassware comprising providing a completely enclosed mould cavity of substantially the form of the finished article of glassware, depositing a charge of glass therein, applying a partial vacuum to the glass at the end of the mould cavity remote from the charging end to compact the glass upon the moulding surfaces at the first mentioned end, rotating the surfaces of the mould cavity and expanding the charge of glass to hollow form over the surface of the mould cavity by the resulting centrifugal force while maintaining the glass compacted against the moulding surfaces at the first-mentioned end of the mould.

3. The method of forming hollow articles of glassware which comprises providing an open-ended mould of substantially the form of the finished article, depositing a charge of glass in the mould through the open end, applying a partial vacuum to the closed end of the mould and thereby compacting a portion of the charge against the moulding surfaces at that end, closing the open end of the mould, rotating the mould about its longitudinal axis and distributing the glass over the inner surfaces of the mould by the resulting centrifugal force while maintaining a layer of compacted glass against the moulding surfaces at said closed end.

4. The method of forming hollow articles of glassware which comprises providing a completely enclosed mould of substantially the form of the finished article with its longitudinal axis positioned substantially vertically and having neck finish forming surfaces at one end and bottom forming surfaces at the other end, opening one end of the mould, depositing a charge of molten glass in the mould, closing the open end of the mould and applying a vacuum to the opposite end to compact the glass against the forming surfaces at that end, rotating the mould about its longitudinal axis and distributing the glass over the inner surface of the mould by the resulting centrifugal force, and, while the mould is spinning, swinging the mould about a horizontal axis to a downwardly disposed position.

5. The method of forming hollow articles of glassware in a completely enclosed mould of substantially the form of the finished article, comprising opening the upper end of the mould and depositing a charge of glass therein, closing that end of the mould, rotating the mould about its longitudinal axis to subject the charge of glass to centrifugal force, and admitting air at atmospheric pressure into a central portion of the charge through the opposite, closed end of the mould to permit the charge to expand under the influence of said centrifugal force, and continuing the rotation of the mould until the charge of glass has covered the interior moulding surfaces of the mould.

6. The method of forming hollow articles of glassware in a mould of substantially the form of the finished article, said mould having a neck finish end positioned downwardly and with a mouth forming pin pointing upwardly, which comprises depositing a charge of glass in the mould, applying a vacuum to the neck finishing portion of the mould to compact the glass therein, rotating the mould about its longitudinal axis to subject the charge of glass to centrifugal force, and admitting air through the mouth forming pin into the interior of the charge t permit the latter to expand under the influenc of centrifugal force to cover the interior mould ing surfaces of the mould.

7. The method of forming hollow articles o glassware in a mould of substantially the form o the finished article, said mould having a nec finish end positioned downwardly and with mouth forming pin pointing upwardly, whic comprises depositing a charge of glass in th mould, applying a vacuum to the neck finishin portion of the mould to compact the glass there in, rotating the mould about its longitudinal ax to subject the charge of glass to centrifugal forc admitting air through the mouth forming pin int the interior of the charge to permit the latter t expand under the influence of centrifugal forc to cover the interior moulding surfaces of tl mould, and continuing the rotation of the moul and maintaining the glass in contact with tl mould by said centrifugal force until the charg of glass has cooled sufficiently to be self-sustair ing, whereby a finished article of glassware formed.

8. The method of forming an article of glas ware which comprises depositing a charge of gla in a mould of substantially the form of tl finished article, compacting the glass in the nec finish portion of the mould by differential a pressure in the neck finish and above the charg rotating the mould about its longitudinal ax and thereby subjecting the glass to centrifug force, admitting air to the interior of the char at a point above the neck finish to permit tl charge to expand under the influence of sa centrifugal force, and continuing the rotation the mould until the charge has expanded to cov the interior moulding surfaces of the mould.

9. An apparatus for forming articles of glas ware comprising a mould having a neck finis portion and a mouth forming pin, means f creating a partial vacuum in the neck finish po tion to compact a charge of glass therein, mea for rotating the mould about its longitudinal ax to subject the charge of glass to centrifugal forc and means for introducing air through said mou forming pin into the interior of the charge permit it to expand under the influence of ce trifugal force, and means for terminating tl rotation of the mould when the glass has cover the interior moulding surfaces of the mould.

10. An apparatus for forming articles of glas ware comprising a mould positioned with its ne forming portion disposed downwardly and inclu ing an upwardly projecting mouth forming pin moulding relation to said neck finish portic means for creating a partial vacuum in the ne finish portion to compact a charge of glass ther in, means for rotating the mould about the a: of the mouth forming pin to subject the char of glass in the mould to centrifugal force, a conduit means extending through said pin atmosphere to conduct atmospheric air throu said pin into the interior of said charge of gl to permit the latter to expand into hollow fo under the influence of said centrifugal force.

11. An apparatus for forming hollow artic of glassware comprising a mould having a ne finish portion and a mouth forming pin dispos concentrically with respect thereto, means compacting a charge of glass in the neck fin portion, means for forming a bubble in the gl adjacent the tip of the neck forming pin, a means for rotating the mould and expanding 1 bubble and the charge of glass under the influer of centrifugal force to form the charge into a shape corresponding to the moulding surfaces of the mould.

12. A forming machine for glassware comprising a support, a sleeve mounted for rotation on a horizontal axis on said support, a mould carried by said sleeve for inversion and reversion upon rotation of the sleeve, said mould being mounted for rotation about its longitudinal axis at right angles to the axis of the sleeve, means for opening one end of the mould when in a charge receiving position, means for applying a vacuum to the closed end of the mould when a charge is received therein to compact the charge of glass against the moulding surfaces at that end, means for closing the open end of the mould, means operative thereafter for rotating the mould about its axis, means for rotating said sleeve to invert the mould, and means for opening the mould when inverted.

13. A forming machine for glassware comprising a support, a sleeve mounted for rotation on a horizontal axis on said support, a mould carried by said sleeve for inversion and reversion upon rotation of the sleeve, said mould having a neck finish portion at its end adjacent the sleeve and a bottom forming end remote therefrom, said mould being mounted for rotation about its longitudinal axis at right angles to the axis of the sleeve, means for opening the bottom forming end of the mould when in a charge receiving position, means for applying a vacuum to the neck finish end of the mould when a charge is received therein to compact the glass in the neck finish, means for closing the bottom forming end of the mould, means operative thereafter for rotating the mould about its axis, means for rotating said sleeve to invert the mould, and means for opening the mould when inverted.

14. A forming machine for glassware comprising a support, a sleeve mounted for rotation on a horizontal axis on said support, a mould carried by said sleeve for inversion and reversion upon rotation of the sleeve, said mould having its bottom forming portion at its end adjacent the sleeve, said mould being rotatably mounted about its longitudinal axis and at right angles to the axis of the sleeve, means for opening the neck forming end of the mould when in a charge receiving position, means for applying a vacuum to the bottom forming end of the mould when a charge is received therein, means for closing the neck forming end of the mould, means operative thereafter for rotating the mould about its axis, means for rotating said sleeve to invert the mould, and means for opening the mould when inverted.

15. A forming machine for glassware comprising a mould, pneumatic means for opening and closing the mould, mechanical power means for rotating the mould about its longitudinal axis, means for revolving the mould about an axis at right angles to said longitudinal axis, and valve means operated in timed relation to said last-mentioned means for controlling the operation of said pneumatic means to open and close the mould at predetermined times in the cycle of revolution of said mould.

16. A forming machine for glassware comprising a mould, pneumatic means for opening and closing the mould, mechanical power means for rotating the mould about its longitudinal axis, additional means for revolving the mould about a horizontal axis at right angles to the mould axis while the mould is rotating, and valve means operated in timed relation to said last-mentioned means for controlling the operation of said pneumatic means to open and close the mould at predetermined times in the cycle of revolution of said mould.

17. A forming machine for glassware comprising a mould supported for rotation about its longitudinal axis, the support for said mould being rotatable about a horizontal axis at right angles to the said mould axis, pneumatic means for opening and closing the mould, mechanical means for rotating the mould about its axis, additional mechanical means for rotating the mould support, cam controlled means for controlling the operation of said pneumatic means to open and close the mould, and additional cam controlled means for initiating and terminating rotation of the mould about its axis, and for initiating and terminating rotation of the support about its axis, all in timed relation to the operations of said pneumatic means.

18. A forming machine for glassware comprising a mould journalled for rotation about its longitudinal axis on a support which is rotatable about a horizontal axis at right angles to the mould axis, pneumatic means mounted on said support for closing and opening the mould, mechanical means for rotating the mould on its axis, mechanical means for rotating the support on its axis of rotation, and control devices for said means effective to close the mould after a charge of glass has been deposited therein, to rotate the mould on its axis to subject the glass to centrifugal force, to rotate the support and thereby swing the mould about said horizontal axis from a charge receiving position to a discharge position, to terminate the rotation of the mould and the support at the latter position, and then to open the mould to discharge an article therefrom.

19. A forming machine for glassware comprising a mould journalled for rotation about its longitudinal axis on a support which is rotatable about a horizontal axis at right angles to the mould axis, pneumatic means mounted on said support for closing and opening the mould, mechanical means for rotating the mould on its axis, mechanical means for rotating the support on its axis of rotation, cam operated control devices for said means, and a common shaft having cams thereon for operating said devices and effective to close the mould after a charge of glass has been deposited therein, to rotate the mould on its axis to subject the glass to centrifugal force, to rotate the support and thereby swing the mould about said horizontal axis from a charge receiving position to a discharge position, to terminate the rotation of the mould and the support at the latter position, and then to open the mould to discharge an article therefrom.

20. A centrifugal glassware forming machine comprising a support, a frame mounted thereon for rotation on a horizontal axis, a mould comprising partible body sections and an end closure member journalled on said frame for rotation on an axis at right angles to said horizontal axis, an air motor on the frame for moving the end closure member to open and close the mould, a second air motor for opening and closing the body sections, means on said support for initiating and terminating rotation of said frame and said mould in predetermined timed relation to each other and at predetermined points in the cycle of rotation of the frame, and additional means for operating said air motors in predetermined timed relation to each other and to the rotation of said frame.

21. A centrifugal glassware forming machine comprising a support, a frame mounted thereon for rotation on a horizontal axis, a mould comprising partible body sections and an end closure member journalled on said frame for rotation on an axis at right angles to said horizontal axis, an air motor on the frame for moving the end closure member to open and close the mould, a second air motor for opening and closing the body sections, a cam shaft on said support, means operated by said shaft for controlling the rotation of said frame and the rotation of said mould, and additional valve means controlled by said shaft for operating said air motors in predetermined timed relation to the rotative movements of said frame.

22. A centrifugal glassware forming machine comprising a support, a frame mounted thereon for rotation on a horizontal axis, a mould comprising partible body sections and an end closure member journalled on said frame for rotation on an axis at right angles to said horizontal axis, an air motor on the frame for moving the end closure member to open and close the mould, a second air motor for opening and closing the body sections, a shaft mounted for rotation on said support, and a plurality of cams fixed thereon, one of said cams controlling the rotation of said mould, another of said cams controlling initiation of rotation of said frame, and other of said cams controlling the operations of said air motors in predetermined timed relation to the rotation of said frame.

23. A centrifugal forming machine for glassware comprising a support rotatable about a horizontal axis, a cage thereon journalled for rotation about an axis at right angles to said horizontal axis, a mould in said cage comprising partible body sections and a relative movable end member, air motors carried by said support adapted to move said end member and to effect relative movement between said mould and cage to open and close the former, and valve means for controlling the operation of said air motors in predetermined timed relation to the rotation of said support.

24. A centrifugal glassware forming machine comprising a support, a frame rotatably mounted about a horizontal axis on said support, a mould holding cage at one end of the frame, a mould in the cage mounted for longitudinal movement with respect thereto for opening and closing the mould, an air motor at the other end of the frame connected to said mould for moving the latter relative to the cage, means for intermittently rotating the frame to invert and revert the mould, and valve means for controlling the flow of air to said motor to open and close said mould at predetermined times in the cycle of rotation of said frame.

25. A centrifugal glassware forming machine comprising a support, a frame rotatably mounted about a horizontal axis on said support, a mould holding cage at one end of the frame, a mould in the cage mounted for longitudinal movement with respect thereto for opening and closing the mould, an air motor at the other end of the frame connected to said mould for moving the latter relative to the cage, means for intermittent rotating the frame to invert and revert the mould, and valve means timed to control the flow of air to said motor to open and close the mould during the periods of rest in the intermittent cycle of rotation of the frame.

26. A centrifugal glassware forming machine comprising a main drive shaft, a worm thereon a clutch connecting the shaft and worm, a sleeve journalled for rotation on a horizontal axis, worm follower on said sleeve in mesh with said worm, a mould supported by said sleeve and journalled for rotation about an axis at right angle to the sleeve axis, a drive shaft for rotating the mould disposed coaxially in the sleeve, a disc on said shaft, a friction driving wheel mounted for relative movement into and out of driving relation to the disc, means for moving the disc and wheel into driving relation to initiate rotation of said shaft to spin the mould about its axis, and means operating in timed relation thereto for engaging said clutch to initiate movement of said worm, said worm follower and said sleeve.

27. A centrifugal glassware forming machine comprising a main drive shaft, a worm thereon a clutch connecting the shaft and worm, a sleeve journalled for rotation on a horizontal axis, worm follower on said sleeve in mesh with said worm, a mould supported by said sleeve and journalled for rotation about an axis at right angles to the sleeve axis, a drive shaft for rotating the mould disposed coaxially in the sleeve, a disc on said shaft, a friction driving wheel mounted for relative movement into and out of driving relation to the disc, cam means for controlling the position of said friction driving wheel to stop and start rotation of the shaft and mould, an additional cam operating means for controlling the transmission of rotation from said main shaft through said worm and follower to rotate said sleeve.

28. An apparatus in accordance with claim characterized in that means are carried by said worm follower for disengaging said clutch at predetermined times in the cycle of rotation of said follower and of said sleeve, whereby the rotation thereof is discontinued when the sleeve and the mould carried thereby have assumed accurately determined positions.

29. An apparatus in accordance with claim characterized in that abutment means are carried by said worm follower for disengaging said clutch at predetermined times in the cycle of rotation of said follower and of said sleeve whereby the rotation thereof is discontinued when the sleeve and the mould carried thereby have assumed accurately determined positions and characterized in that means driven by said main drive shaft are provided for re-engaging said clutch after predetermined time intervals.

SAMUEL E. WINDER.